(No Model.)
G. W. JOHNSON.
MUZZLE.
No. 435,308. Patented Aug. 26, 1890.
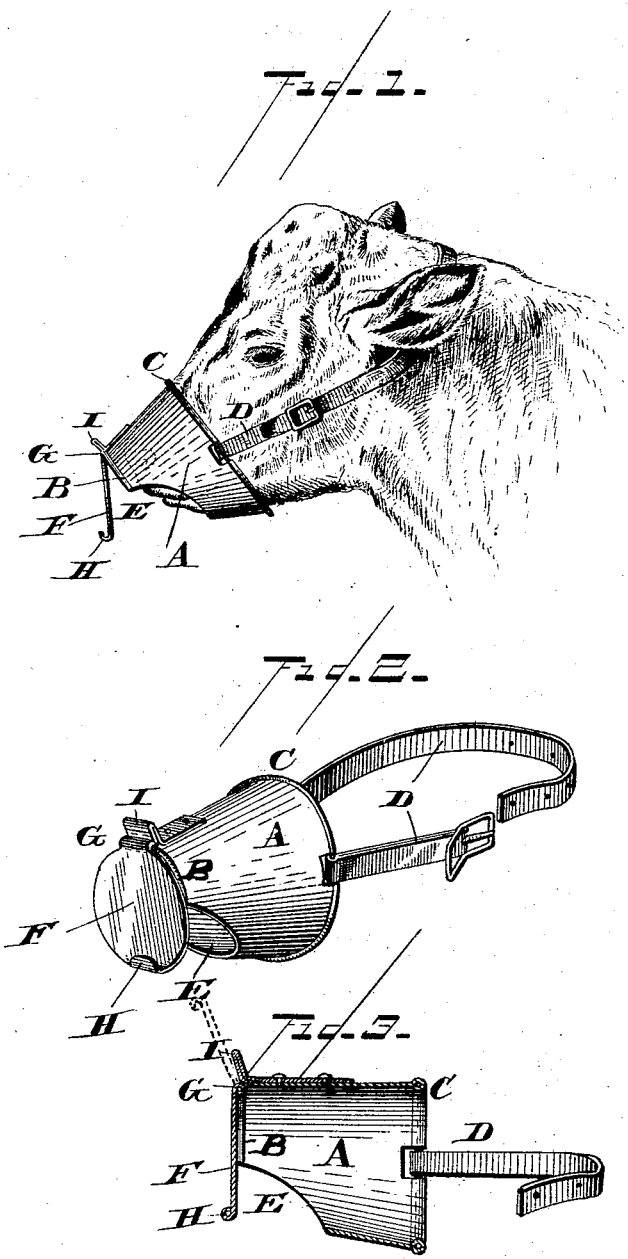

UNITED STATES PATENT OFFICE.

GEORGE W. JOHNSON, OF WOMER, KANSAS, ASSIGNOR OF ONE-THIRD TO CHARLES H. COULSON, OF SAME PLACE.

MUZZLE.

SPECIFICATION forming part of Letters Patent No. 435,308, dated August 26, 1890.

Application filed January 13, 1890. Serial No. 336,821. (No model.)

*To all whom it may concern:*

Be it known that I, GEORGE W. JOHNSON, a citizen of the United States, and a resident of Womer, in the county of Smith and State of Kansas, have invented certain new and useful Improvements in Weaning-Muzzles; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view illustrating my improved weaning-muzzle in position upon the animal. Fig. 2 is a perspective view of the muzzle detached from the animal, and Fig. 3 is a longitudinal sectional view of the same.

Like letters of reference denote corresponding parts in all the figures.

This invention relates to devices for weaning calves, foals, and other sucking animals by preventing access to the teats of the mother; and it consists in the detailed construction and combination of parts of the weaning-muzzle, which will be hereinafter more fully described and claimed.

Reference being had to the accompanying drawings, the letter A designates the body or head-piece of the muzzle, which is preferably made of sheet metal of suitable thickness and slightly tapering, so as to make an easy fit over the snout of the animal. This part A is re-enforced at both ends by the annular bands or beads B and C, and is provided at its larger end with a strap D, adapted to be buckled around the back part of the head of the animal, so as to hold the muzzle firmly in place, as illustrated in Fig. 1. The reduced front end of the head-piece A is cut away slantingly on the under side, as shown at E, forming an opening between said part and the hinged door or shutter F, which is hinged at G to the top part of the reduced end of the head-piece at the extreme outer end of the same. This door or shutter F is of circular shape and is bent or turned up at its lower free end, as shown at H, to form a swell or bead, the object of which is to prevent injury to the cow or mare by the sharp lower edge of the door coming in contact with the udder of the animal when the calf or filly in attempting to suck brings the muzzle up against it. The bead B answers a similar purpose by preventing the reduced end of the muzzle part from doing injury to the udder.

The door F is prevented from swinging too far back by a stop I, fastened to the top part of the muzzle and limiting the upward play or throw of the door, as indicated in dotted lines in Fig. 3.

This device, it will be seen, is inexpensive, is easily applied without injury or discomfort to the animal, and is so strong and simple in its construction that it cannot readily become damaged or broken.

The hinged door, in conjunction with the aperture or cut-away portion E, permits the animal to feed and drink readily, but prevents access to the teats when it attempts to suck by closing the outer end of the muzzle.

Having thus described my invention, I claim and desire to secure by Letters Patent of the United States—

The improved weaning-muzzle herein shown and described, comprising the tapering head part or body A, cut away obliquely at E and provided with the strap D and projecting stop I, in combination with the hinged door or shutter F, bent at its lower end to form the rounded part or bead H, substantially as and for the purpose set forth.

In testimony that I claim the foregoing as my own I have hereunto affixed my signature in presence of two witnesses.

GEORGE W. JOHNSON.

Witnesses:
THEO. SHOEMAKER,
J. D. MOSSMAN.